United States Patent [19]

Vu et al.

[11] Patent Number: 4,916,430

[45] Date of Patent: Apr. 10, 1990

[54] BACK UP REAR VIEW MIRROR LIGHT

[76] Inventors: Thuan D. Vu, 323 18th St., Brooklyn, N.Y. 11215; George Spector, 233 Broadway RM 3815, New York, N.Y. 10007

[21] Appl. No.: 266,578

[22] Filed: Nov. 3, 1988

[51] Int. Cl.$^4$ ............................................... B60Q 1/00
[52] U.S. Cl. .................................... 340/463; 362/83.1; 362/135
[58] Field of Search ........... 340/463, 468, 472, 815.17, 340/815.16; 362/83, 83.1, 135, 80; 350/600, 631

[56] References Cited

U.S. PATENT DOCUMENTS

| | | | |
|---|---|---|---|
| 1,353,253 | 9/1920 | Livingston et al. | 362/83.1 |
| 2,561,582 | 7/1951 | Marbel | 350/600 X |
| 2,600,751 | 6/1952 | Gazda | 362/83.1 |
| 4,274,078 | 6/1981 | Isobe et al. | 362/83.1 |
| 4,475,100 | 10/1984 | Duh | 362/83.1 |
| 4,661,800 | 4/1987 | Yamazaki | 362/83.1 |

Primary Examiner—Joseph A. Orsino
Assistant Examiner—Brian R. Tumm

[57] ABSTRACT

A backup sideview mirror light for a motor vehicle is provided and consists of a housing that has a rearwardly facing opening mounted to underside of a sideview mirror which is adapted for attachment to a door of the motor vehicle, with an auxiliary lamp mounted within the housing. A reflector mirror and a transparent lens each cover a portion of the opening. Reflected light beams from the auxiliary lamp cause the reflector mirror to serve as an auxiliary backup warning light while direct light beams from the auxiliary lamp coming through the transparent lens are directed rearwardly to illuminate rear fender of the motor vehicle to help driver to see at night when parking.

4 Claims, 1 Drawing Sheet

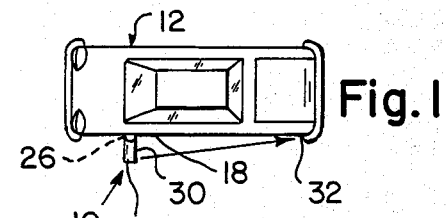
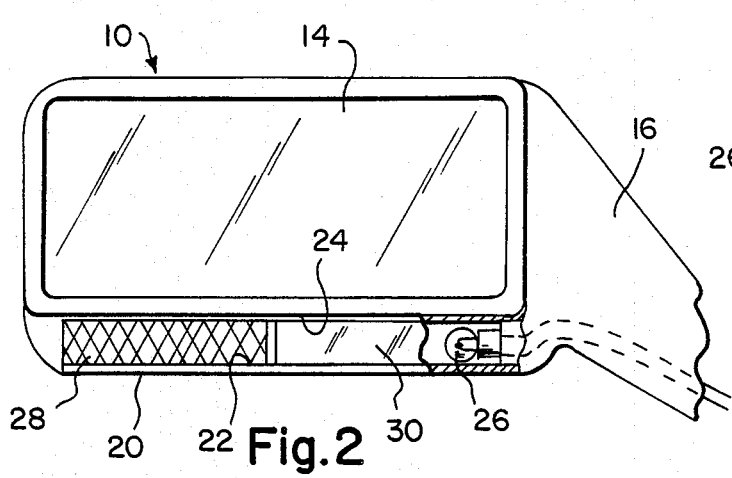
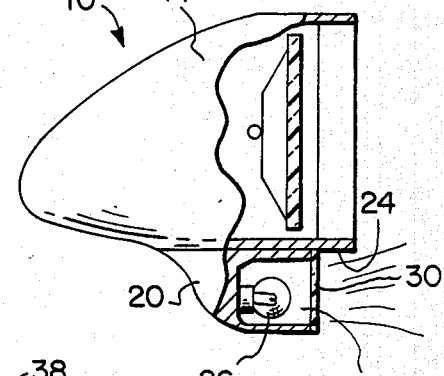
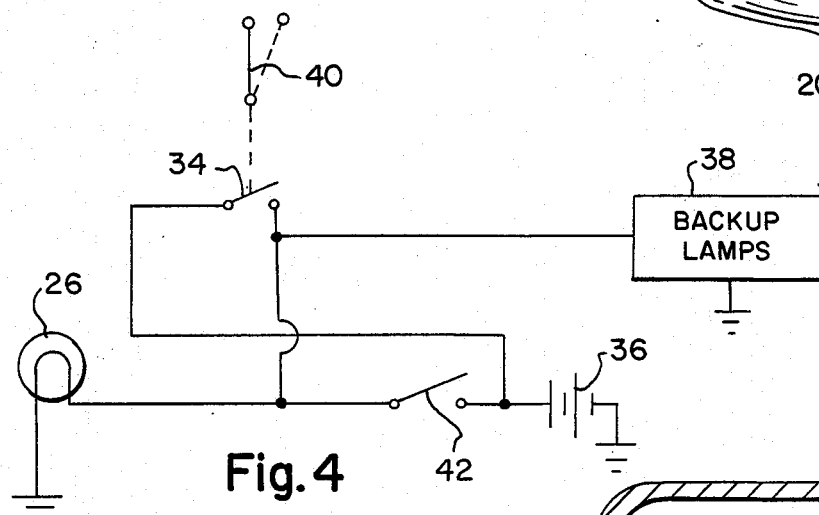
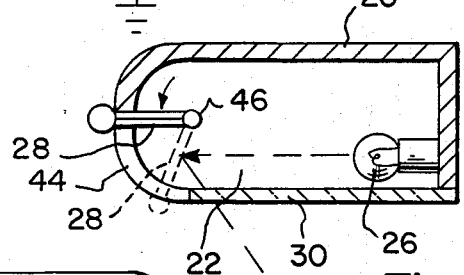
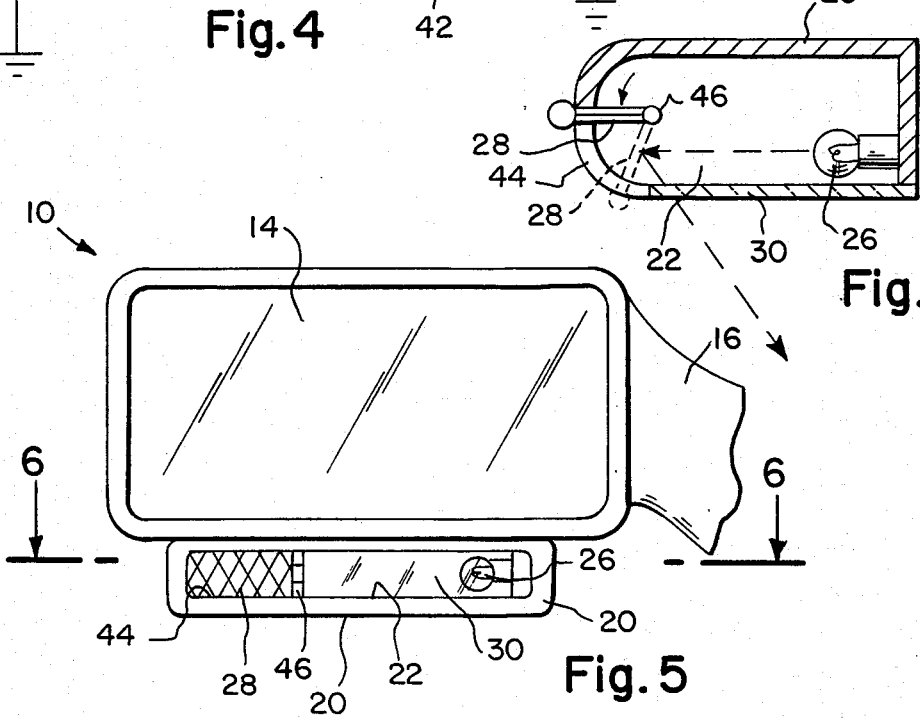

BACK UP REAR VIEW MIRROR LIGHT

BACKGROUND OF THE INVENTION

The instant invention relates generally to motor vehicle mirrors and more specifically it relates to a backup sideview mirror light for a motor vehicle.

Numerous vehicle mirrors have been provided in prior art that are adapted to include electric light bulbs primarily used for signal indicating. For example, U.S. Pat. Nos. 2,595,331; 3,266,016 and 4,475,100 all are illustrative of such prior art. While these units may be suitable for the particular purpose to which they address, they would not be as suitable for the purposes of the present invention as heretofore described.

SUMMARY OF THE INVENTION

A primary object of the present invention is to provide a backup sideview mirror light for a motor vehicle that will overcome the shortcomings of the prior art devices.

Another object is to provide a backup sideview mirror light for a motor vehicle that will illuminate the rear side fender when the gear shift lever in the motor vehicle is placed into reverse helping the driver to see at night when parking.

An additional object is to provide a backup sideview mirror light for a motor vehicle in which light beams from an auxiliary lamp mounted below the sideview mirror can be aimed and reflected away by an adjustable reflective mirror portion therein.

A further object is to provide a backup sideview mirror for a motor vehicle that is simple and easy to use.

A still further object is to provide a backup sideview mirror for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top view of a motor vehicle with invention installed thereon so that light beams can be reflected back to rear fender at night for parking.

FIG. 2 is a front view of the invention with parts broken away.

FIG. 3 is a side view thereof with parts broken away.

FIG. 4 is a diagrammatic view of the wiring system for the auxiliary lamp which is connected to a backup switch operated by a gear shift lever in the motor vehicle.

FIG. 5 is a modification in which the reflector mirror pivots for adjustment with respect to the stationary light portion.

FIG. 6 is a cross sectional view taken along line 6—6 in FIG. 5 showing the adjustable reflector mirror in greater detail.

DETAILED DESCRIPTION OF THE PREFERRED EMBODIMENTS

Turning now descriptively to the drawings, in which similar reference characters denote similar elements throughout the several views, FIGS. 1, 2 and 3 illustrate a backup sideview mirror light 10 for a motor vehicle 12 consisting of a framed sideview mirror 14 adapted for attachment, with bracket 16, to a door 18 of the motor vehicle 12. A housing 20 that has an opening 22 is mounted to underside 24 of the sideview mirror 14 so that the opening 22 is facing rearwardly. An auxiliary lamp 26 is mounted within the housing 20. A reflector mirror 28 is mounted within housing 20 and aligns with a portion of the opening 22 whereby reflected light beams from the auxiliary lamp 26 on the reflector mirror 28 causes the reflector mirror to glow thus serving as a clearly visible auxiliary backup warning light. A transparent lens 30 covers another portion of the opening 22 whereby direct light beams from the auxiliary lamp 26 comes through the transparent lens 30 and are directed rearwardly to illuminate rear fender 32 of the motor vehicle to help driver (not shown) see at night when parking.

As shown in FIG. 4 a backup switch 34 is electrically connected between a battery 36 and standard backup lamps 38 in the motor vehicle 12. The backup switch 34 is mechanically connected to a gear shift lever 40 in the motor vehicle 12 so that when the gear shift lever 40 is placed into reverse the backup switch 34 will close activating the standard backup lamps 38. The auxiliary lamp 26 is electrically connected to the backup switch 34 so that when the backup switch closes the auxiliary lamp 26 will also be activated.

A manual switch 42 can also be provided and mounted on dashboard (not shown) of the motor vehicle 12. The manual switch 42 is electrically connected between the battery 36 and the auxiliary lamp 26 so that when the manual switch 42 is closed the auxiliary lamp 26 will be activated thus bypassing the backup switch 34.

FIGS. 5 and 6 show a modification in which the housing 20 has a slot 44 formed at the opening thereof. A hinge 46 is disposed within the housing 20 and connected at one end of the reflector mirror 28 with other end of the reflector mirror extending through the slot 44. The reflector mirror 28 can be manually adjusted with respect to the housing 20 to pivot therein, allowing some of the reflected light beams from the auxiliary lamp 26 to be directed rearwardly to aid in illuminating the rear fender 32 of the motor vehicle 12. A ball joint can be used for hinge 46 for vertical adjustment to see the curb-line.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A backup sideview mirror light for a motor vehicle which comprises:
   (a) a framed sideview mirror adapted for attachment to a door of the motor vehicle;
   (b) a housing having an opening, said housing mounted to the underside of said sideview mirror so that said opening is facing rearwardly;

(c) an auxiliary lamp mounted within said housing;

(d) a reflector mirror mounted in said housing and aligned with a portion of said opening wherby reflected light beams from said auxiliary lamp on said reflector mirror causes said reflector mirror to glow thus serving as a clearly visible auxiliary backup warning light; and (e) a transparent lens to cover another portion of said opening whereby direct light beams from said auxiliary lamp coming through said transparent lens are directed rearwardly to illuminate rear fender of the motor vehicle to help a driver see at night when parking.

2. A backup sideview mirror light as recited in claim 1, further including:

(a) a backup switch electrically connected between a battery and standard backup lamps in the motor vehicle, said backup switch is mechanically connected to a gear shift lever in the motor vehicle so that when the gear shift lever is placed into reverse said backup switch will close activating the standard backup lamps and (b) said auxiliary lamp is electrically connected to said backup switch so that when said backup switch closes said auxiliary lamp will also be activated.

3. A backup sideview mirror light as recited in claim 2, further including a manual switch adapted to be mounted on dashboard of the motor vehicle, said manual switch is electrically connected between the battery and said auxiliary lamp so that when said manual switch is closed said auxiliary lamp will be activated thus by-passing said backup switch.

4. A backup sideview mirror light as recited in claim 3 further including:

(a) said housing having a slot formed as said opening thereof; and (b) a hinge disposed within said housing and connected at one end of said reflector mirror, with the other end of said reflector mirror extending through said slot so that said reflector mirror can be manually adjusted with respect to said housing to pivot therein allowing some of the reflected light beams from said auxiliary lamp to be directed rearwardly to aid in illuminating the rear fender of the motor vehicle.

* * * * *